(12) United States Patent
Lickfelt et al.

(10) Patent No.: US 9,305,410 B2
(45) Date of Patent: Apr. 5, 2016

(54) AUTOMATIC DETECTION OF VALET MODE FOR SMART ENTRY SYSTEMS

(75) Inventors: Brian K. Lickfelt, Powell, OH (US); Hideaki Arai, Powell, OH (US); Thomas G. Kracker, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 361 days.

(21) Appl. No.: 13/197,920

(22) Filed: Aug. 4, 2011

(65) Prior Publication Data
US 2013/0033361 A1 Feb. 7, 2013

(51) Int. Cl.
*G07C 9/00* (2006.01)
*B60R 25/00* (2013.01)

(52) U.S. Cl.
CPC ............ *G07C 9/00111* (2013.01); *B60R 25/00* (2013.01); *G07C 9/00309* (2013.01)

(58) Field of Classification Search
CPC ................................. G01D 5/145; G01B 7/046
USPC ..................... 340/686.1–686.6, 5.72, 426.36; 180/287; 701/49; 70/276, 352
See application file for complete search history.

(56) References Cited

U.S. PATENT DOCUMENTS

| | | | | |
|---|---|---|---|---|
| 3,782,147 A | * | 1/1974 | Hallmann | 70/276 |
| 4,734,693 A | * | 3/1988 | Dluhosch et al. | 340/5.23 |
| 4,788,623 A | * | 11/1988 | Haug | 361/171 |
| 4,922,736 A | * | 5/1990 | Tanaka et al. | 70/277 |
| 5,548,984 A | * | 8/1996 | Miyatsu | 70/276 |
| 5,677,664 A | * | 10/1997 | Sawinski | 340/426.12 |
| 6,275,141 B1 | * | 8/2001 | Walter | 340/5.64 |
| 6,386,007 B1 | | 5/2002 | Johnson et al. | |
| 6,550,298 B1 | * | 4/2003 | Su | 70/276 |
| 7,075,409 B2 | * | 7/2006 | Guba | 340/5.21 |
| 7,394,353 B2 | | 7/2008 | Schambeck et al. | |
| 7,634,932 B2 | | 12/2009 | Cadiz et al. | |
| 2004/0124969 A1 | * | 7/2004 | Okada | 340/5.72 |
| 2007/0120642 A1 | | 5/2007 | Narayanaswamy et al. | |
| 2007/0227866 A1 | | 10/2007 | Dimig | |
| 2010/0039215 A1 | | 2/2010 | Proefke et al. | |
| 2010/0235026 A1 | * | 9/2010 | Shimizu et al. | 701/22 |

FOREIGN PATENT DOCUMENTS

| | | |
|---|---|---|
| JP | 2006-225976 | 8/2006 |
| JP | 201023548 | 2/2010 |

* cited by examiner

*Primary Examiner* — James Yang
*Assistant Examiner* — Laura Nguyen
(74) *Attorney, Agent, or Firm* — Rankin, Hill & Clark LLP

(57) ABSTRACT

A key fob assembly includes a mechanical key, a key fob, a control in the key fob, Hall effect switches in the key fob, and magnets associated with the mechanical key. The mechanical key is configured to cooperate with a mechanical lock. The key fob is configured to selectively connect with the mechanical key. The control in the key fob is for transmitting wireless signals to a vehicle to actuate components on the vehicle. The Hall effect switches in the key fob are each in electrical communication with the control. At least one of the Hall effect switches changes an operating state based on detecting a positive magnetic field and at least one other Hall effect switch changes an operating state based on detecting a negative magnetic field. Respective poles of the magnets are disposed such that connection of the mechanical key with the key fob in a storage position aligns the poles of the magnets with respective Hall effect switches for changing the operating state of the respective Hall effect switches.

10 Claims, 2 Drawing Sheets

AUTOMATIC DETECTION OF VALET MODE FOR SMART ENTRY SYSTEMS

BACKGROUND

The present disclosure generally relates to vehicles that include passive entry or smart entry systems. Smart entry systems utilize a key fob to control specific functions and components on a vehicle. Signals sent from the key fob can initiate door locks, trunk locks, glove box locks, and various other security controls. Signals sent from the key fob also can initiate the ignition of the vehicle.

As the key fob is capable of controlling more and more components on the vehicle, problems can arise. For example, an operator of a vehicle can choose to allow a parking valet attendant to use the key fob when parking the vehicle. The driver may wish to limit access to certain locations on the vehicle as well as certain functions of the vehicle when the vehicle is being parked by a valet attendant.

Key fob assemblies that communicate with controls on a vehicle to limit the number of controls available to a valet are known. Each of these known attempts, however, are either unduly complex or have a security feature that may be easily overcome by the parking valet attendant, thus, allowing the valet attendant access to locations on the vehicle and functions of the vehicle that the driver of the vehicle wished for the valet attendant to not have access to.

SUMMARY

An example of a mechanical key for cooperating with a key fob that can overcome at least one of the aforementioned shortcomings includes a head, a blade connected with the head, and magnets in the head. The head includes a key fob facing surface. The blade extends from the head in a first direction. The magnets in the head each have a respective key fob facing pole adjacent to a key fob facing surface. The magnets are positioned in or on the head such that at least one of the key fob facing poles is different in polarity than at least one other key fob facing pole.

An example of a key fob that can overcome at least one of the aforementioned shortcomings includes a key fob housing, a control in the housing, and Hall effect switches in the housing. The key fob housing includes a slot for receiving a mechanical key. The control in the housing is for transmitting wireless signals to a vehicle to actuate components on the vehicle. The Hall effect switches in the housing are each in electrical communication with the control. At least one of the Hall effect switches is configured to change a respective operating state based on detecting a positive magnetic field. At least one other Hall effect switch is configured to change a respective operating state based on detecting a negative magnetic field.

An example of a key fob assembly that can overcome at least one of the aforementioned shortcomings includes a mechanical key, a key fob, a control in the key fob, Hall effect switches in the key fob, and magnets associated with the mechanical key. The mechanical key is configured to cooperate with a mechanical lock. The key fob is configured to selectively connect with the mechanical key. The control in the key fob is for transmitting wireless signals to a vehicle to actuate components on the vehicle. The Hall effect switches in the key fob are each in electrical communication with the control. At least one of the Hall effect switches changes an operating state based on detecting a positive magnetic field and at least one other Hall effect switch changes an operating state based on detecting a negative magnetic field. Respective poles of the magnets are disposed such that connection of the mechanical key with the key fob in a storage position aligns the poles of the magnets with respective Hall effect switches for changing the operating state of the respective Hall effect switches.

A passive entry system that can overcome at least one of the aforementioned shortcomings includes the aforementioned key fob assembly, a vehicle, a receiver on the vehicle for receiving wireless signals from the key fob assembly, a transmitter on the vehicle for transmitting vehicle originating wireless signals to the key fob assembly, and a control unit in communication with the receiver, transmitter, and security systems on the vehicle. The control unit is configured to lock secured areas on the vehicle via at least one of the security systems in response to receiving a valet mode signal from the key fob assembly indicating that the mechanical key has been disconnected from the key fob.

DETAILED DESCRIPTION

Figure 1:
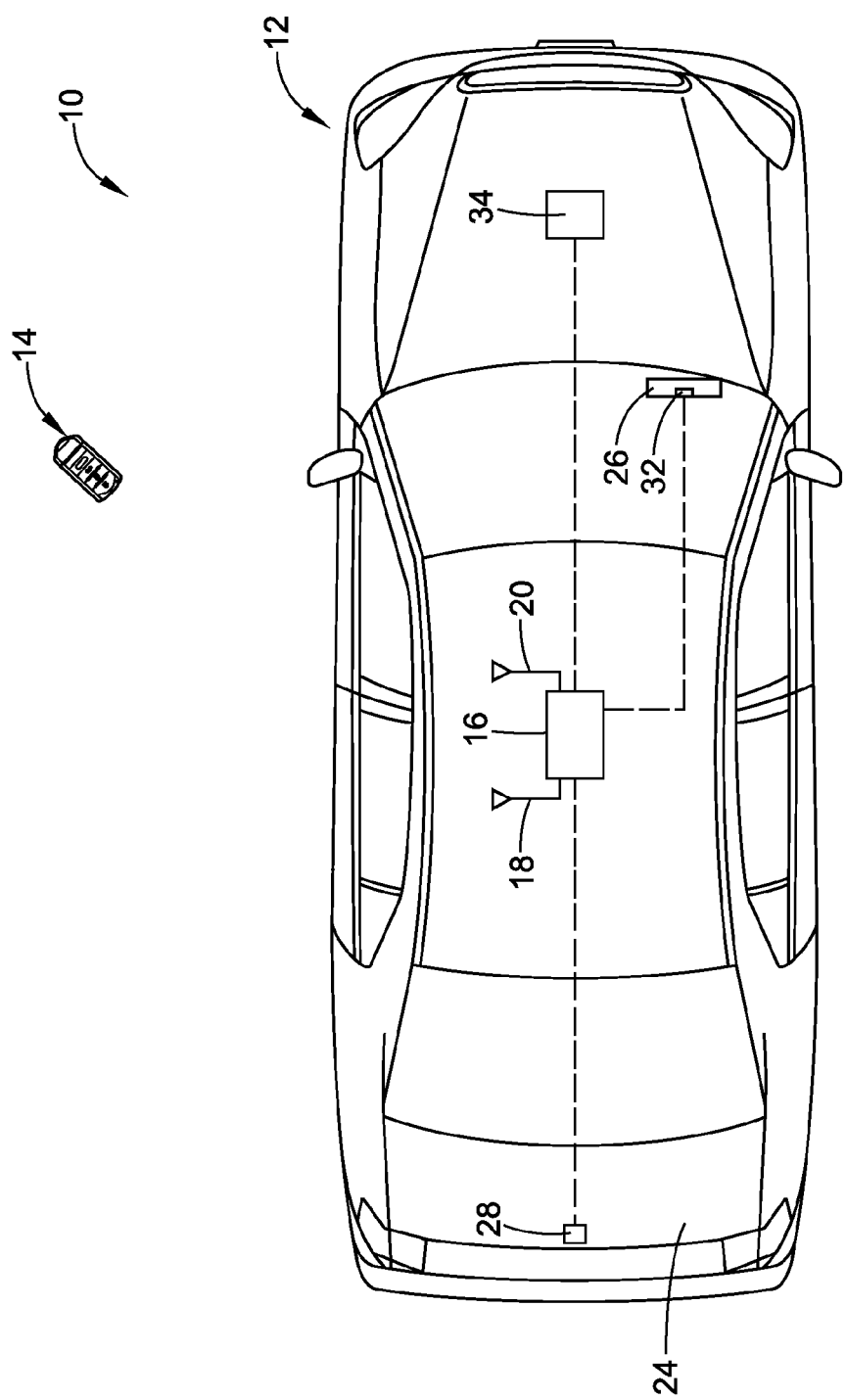
FIG. 1 is a schematic depiction of a vehicle including a passive entry system.

Throughout the specification and claims, the following terms take the meanings explicitly associated herein, unless the context clearly dictates otherwise. As used herein, the term "or" is equivalent to the term "and/or" unless the context clearly dictates otherwise. The term "based on" is not exclusive and allows for being based on additional factors not described, unless the context clearly dictates otherwise. In addition, throughout the specification and claims, the meaning of "a," "an," and "the" include plural references. Moreover, reciting a number of components, e.g. "two antennas," does not preclude the use of more than the recited number of components, and unless the context clearly dictates otherwise, the recitation of a certain number of components should be construed as a minimum number of components. The descriptions and drawings herein are merely illustrative and various modifications and changes can be made in the structures and steps disclosed without departing from the present disclosure. Various identified components of a vehicle disclosed herein are merely terms of art and may vary from one vehicle manufacturer to another. The terms should not be deemed to limit the present disclosure. The drawings are shown for purposes of illustrating one or more exemplary embodiments and are not for purposes of limiting the appended claims. All references to direction and position, unless otherwise indicated, refer to the orientation of the components illustrated in the drawings and should not be construed as limiting the appended claims.

FIG. 1 depicts a passive entry system or a smart entry system 10 for a vehicle 12. The passive entry system 10 includes a key fob assembly 14 capable of transmitting wireless signals to and receiving wireless signals from a control unit 16 on the vehicle 12. The passive entry system includes a receiver 18 on the vehicle 12 for receiving the wireless signals from the key fob assembly 14. The passive entry system 10 also includes a transmitter 20 on the vehicle 12 for transmitting vehicle originating wireless signals to the key fob assembly 14. The receiver 18 and the transmitter 20 are schematically depicted as separate antennas; however, the receiver 18 and transmitter 20 can be combined into a transceiver or a similar device capable of receiving and transmitting wireless signals.

The control unit 16 is in communication with the receiver 18, the transmitter 20, and security systems, which will be described later, on the vehicle 12. The control unit 16 is configured to communicate with the security systems to lock secured areas on the vehicle 12 via at least one of the security systems in response to receiving a valet mode signal from the key fob assembly 14. The aforementioned secured areas can include a trunk 24 of the vehicle 12 as well as a glove box 26 of the vehicle. As such, the control unit 16 is capable of communicating with a trunk lock assembly 28 for locking the trunk 24 to limit access to the trunk and a glove box lock assembly 32 associated with the glove box 26 to limit access to the glove box. The control unit 16 is also capable of communicating with an engine 34 of the vehicle 12. The control unit 16 can limit operation of the engine 34 of the vehicle, e.g. limit the RPM or operation time of the engine, in response to receiving the valet mode signal from the key fob assembly 14. These are just a few examples of secured areas of the vehicle 12 where access can be denied upon receiving the valet mode signal from the key fob assembly 14. Other security systems and secured areas are contemplated.

Figure 2:
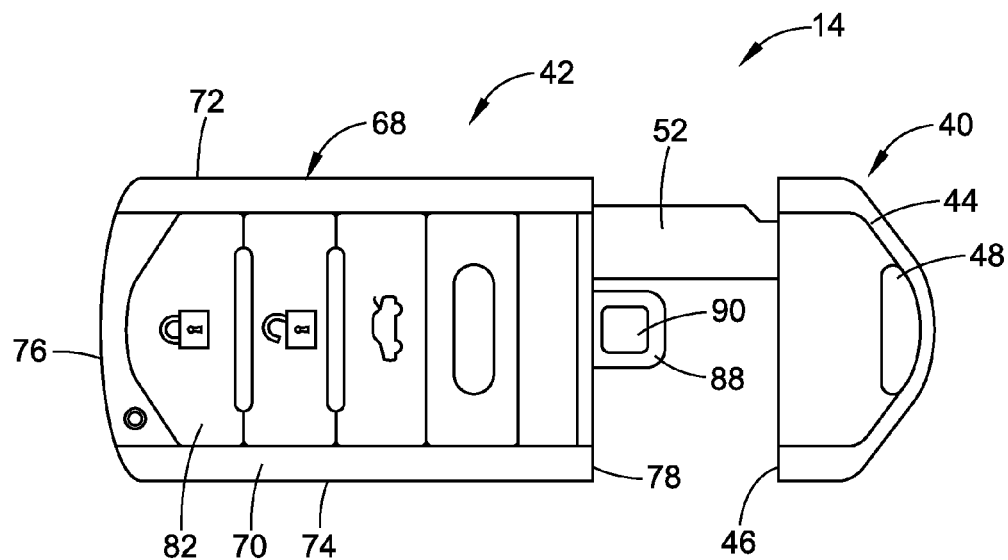
FIG. 2 is a top plan view of a key fob assembly for the passive entry system depicted in FIG. 1.

FIG. 2 depicts the key fob assembly 14 which includes a mechanical key 40 and a key fob 42 that is configured to selectively connect with the mechanical key. The mechanical key 40 is configured to cooperate with a mechanical lock, such as those typically found in vehicle doors and vehicle ignition assemblies. The mechanical key 40 connects with the key fob 42 in a manner such that the key fob assembly 14 can be carried as a unit with the mechanical key attached to the key fob. The mechanical key 40 is removable from the key fob 42, which allows the key fob 42 to be given to a parking valet attendant to operate the vehicle 12.

With reference back to FIG. 1, the control unit 16 is configured to lock secured areas on the vehicle 12 in response to receiving a valet mode signal from the key fob assembly 14 indicating that the mechanical key 40 has been removed from the key fob 42. Accordingly, with the mechanical key 40 detached from the key fob 42, secured areas on the vehicle 12, e.g. the trunk 24 and the glove box 26, can be locked from the valet attendant and operation of the engine 34 can be limited.

With reference back to FIG. 2, the mechanical key 40 includes a head 44 including a key fob facing surface 46. An opening 48 can be provided through the head 44 to facilitate hanging the key fob assembly 14 from a hook. A blade 52 connects with the head 44 and extends from the head in a first direction. The blade 52 is configured to be inserted into mechanical locks found on the vehicle 12 to operate these locks in a conventional manner.

Figure 3:
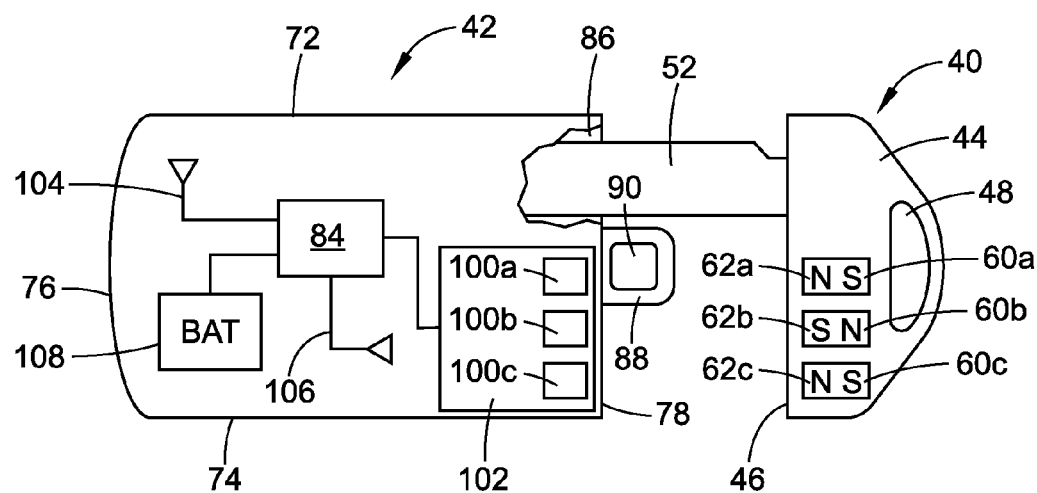
FIG. 3 is a schematic depiction of a key fob assembly depicted in FIG. 2.

With reference to FIG. 3, magnets 60a, 60b, 60c in the head 44 each have a respective key fob facing pole 62a, 62b, 62c adjacent the key fob facing surface 46. The magnets 60a, 60b, 60c are positioned in or on the head 44 such that at least one of the key fob facing poles, e.g. key fob facing pole 62b, is different in polarity than at least one other key fob facing pole, e.g. key fob facing poles 62a and 62c. The magnets 60a, 60b, 60c are schematically depicted in FIG. 3. Each magnet can be very small. For example, the magnets can be cylindrical in shape having a diameter less than about 1.60 mm and an axial dimension less than about 0.80 mm. Each of the magnets 60a, 60b, 60c can be a rare earth magnet. As mentioned above, the blade 52 extends from the head 44 in a first direction. The magnets 60a, 60b, 60c can be spaced from one another along a second direction, which is generally perpendicular to the first direction. As depicted, the key fob assembly 14 includes a first magnet 60a, a second magnet 60b, and a third magnet 60c. A fewer or greater number of magnets could be employed; however, the greater the number of magnets found in or on the head 44 results in a greater number of possible combinations for differences in polarity among the key fob facing poles. This increases the security of the passive entry system 10.

As depicted, the polarity of the key fob facing pole 62b of the second magnet 60b is different than the polarity of the key fob facing poles 62a and 62c of both of the first magnet 60a and the third magnet 60c. As depicted, the second magnet 60b is disposed between the first magnet 60a and the third magnet 60c along the second direction, which is generally perpendicular to the first direction, i.e., the direction in which the blade 52 extends from the head 44. As depicted, each of the magnets 60a, 60b and 60c is disposed on a same side of the blade 52.

With reference back to FIG. 2, the key fob 42 includes a key fob housing 68. As depicted, the key fob housing 68 is generally box-shaped and includes an upper surface 70, a lower surface (not visible) opposite the upper surface, a left surface 72, a right surface 74, a rear surface 76, and a key head facing surface 78. Buttons 82 on the upper surface 70 operate switches (not depicted) associated with a control 84 (FIG. 3) for transmitting wireless signals from the key fob assembly 14 to the control unit 16 (FIG. 1) on the vehicle 12 to actuate components on the vehicle. To connect the key fob 42 with the mechanical key 40, the key fob housing 68 includes a mechanical key slot 86 for receiving the mechanical key 40. The mechanical key 40 can connect with the key fob 42 in other manners. In the illustrated embodiment, the slot 86 is elongated in the first direction and is configured to receive the blade 52 of the mechanical key 40. The key head facing surface 78 spans between the upper surface 70 and the lower surface (not shown) as well as between the left surface 72 and the right surface 74. The slot 86 extends into the housing 42 from the key head facing surface 78. In the illustrated embodiment, the slot 86 is positioned nearer one side surface, e.g. the left side surface 72, as compared to the opposite side surface, e.g. the right side surface 74. A hasp 88 including an opening 90 extends from the key head facing surface 78 of the key fob housing 68 toward the head 44 of the mechanical key 40. When the mechanical key 40 connects with the key fob housing 68 in a storage position, the hasp 88 is received in a cavity (not visible) in the key head 44 and cooperates with a latching mechanism (not shown) to secure the mechanical key 40 to the key fob housing 68. The hasp 86 is also useful to hang the key fob 42 from a hook when the key fob has been given to a valet attendant. The key fob facing surface 46 of the key head 44 has a complementary shape to the key head facing surface 78 of the key fob housing 68 to further facilitate attachment of the mechanical key 40 to the key fob 42.

The key fob assembly 14 also includes Hall effect switches 100a, 100b, 100c in the key fob housing 42. Each Hall effect switch 100a, 100b, 100c is in electrical communication with the control 84. At least one of the Hall effect switches, e.g. the Hall effect switch 100b, is configured to change a respective operating state (e.g., from OFF to ON) based on detecting a positive magnetic field and at least one other Hall effect switch, e.g. Hall effect switches 100a and 100c, are each configured to change a respective operating state (e.g., from OFF to ON) based on detecting a negative magnetic field. In the illustrated embodiment, each Hall effect switch 100a, 100b, 100c is disposed adjacent one another and on a same side of the slot 86 that receives the blade 52. At least one of the Hall effect switches, e.g. the Hall effect switch 100b, is configured to change the respective operating state based on detecting a different magnetic field as compared to another Hall effect switch, e.g. the Hall effect switches 100a and 100c, immediately adjacent the at least one Hall effect switch 100b. Each Hall effect switch 100a, 100b, 100c can be associated with an integrated circuit 102. The integrated circuit 102 is configured to output an output signal to the control 84.

The respective magnetic field that changes the operating state of each Hall effect switch 100a, 100b, 100c can be selectively configurable. If desired, each Hall effect switch 100a, 100b, 100c can be software configurable to selectively configure the respective magnetic field that is detected which results in the change in the respective operating state of the Hall effect switch. Each Hall effect switch 100a, 100b, 100c can have a low operating voltage, e.g. 1.65V-3.5V, and a unique clocking algorithm, which assists in reducing the average operating power consumption of the Hall effect switches. Magnetic actuation of each of the Hall effect switches 100a, 100b, 100c can be set to operate in a unipolar mode, which allows each respective Hall effect switch to change an operating state on detection of a north or south polarity, but not both. The control 84 is configured to transmit a valet mode signal to the vehicle 12, and more particularly, to the control unit 16 on the vehicle, upon detecting a predetermined operating state for each of the Hall effect switches 100a, 100b, 100c.

As illustrated, the first Hall effect switch 100a is configured to change its respective operating state upon detecting a negative field (north pole), the second Hall effect switch 100b is configured to change its respective operating state based upon detecting a positive field (south pole), and the third Hall effect sensor 100c is configured to change its respective operating state based upon detecting a negative field (north pole). If these fields are not detected, this is an indication that the mechanical key 40 has been disconnected from the key fob 42 and as such the control 84 in the key fob housing 68 transmits a valet mode signal to the vehicle, and in response to the control unit 16 on the vehicle 12 detecting the valet mode signal secured areas on the vehicle are locked out.

The key fob assembly 14 includes a transmitter 104 for transmitting wireless signals to the vehicle 12 and a receiver 106 for receiving vehicle originating wireless signals from the vehicle. The key fob assembly 14 further includes a power source 108 for providing power to the control 84 and the integrated circuit 102, which includes the Hall effect sensors 100a, 100b, 100c.

With reference back to FIG. 1, the passive entry system 10 can operate in the following manner. The control unit 16 transmits via the transmitter 20 vehicle originating wireless signals to the key fob assembly 14. These signals are picked up by the receiver 104 and wireless signals from the key fob assembly 14 are transmitted back to the control unit 16 via the transmitter 106. The wireless signals from the key fob assembly 14 can include an identification signal and a mode signal, which can be incorporated into a single transmission. The identification signal identifies the key fob 14 and the control unit 16 can be programmed to determine whether a particular key fob transmitting a wireless signal is an appropriate fob for operating components on the vehicle 12. If the identification of the wireless signal from the key fob assembly 14 matches according to a determination made by the control unit 16, then the mode of the key fob assembly 14 is determined. As mentioned above, the control unit 16 is configured to lock secured areas on the vehicle 12 via one of the security systems on the vehicle in response to receiving a valet mode signal from the key fob assembly 14 indicating that the mechanical key 40 has been disconnected from the key fob 42. In the illustrated embodiment, the valet mode signal is transmitted from the key fob 42 based on the mechanical key 40 being removed from the mechanical key slot 86. As such, if the mechanical key 40 is not attached to the key fob housing 42, the output signal from the integrated circuit 102, which is associated with the Hall effect switches 100a, 100b, 100c, indicates that the key fob assembly 14 is in valet mode and this mode is communicated to the control unit 16 on the vehicle. When the mechanical key 40 is properly connected with the key fob 42, the plurality of magnets 60a, 60b, 60c align with the respective Hall effect switches 100a, 100b, 100c such that the key fob facing poles 62a, 62b, 62c are detected by the respective Hall effect switches. When the mechanical key 40 is in the storage position with respect to the key fob housing 68, the Hall effect switches 100a, 100b, 100c are in the appropriate operating state such that the output signal from the integrated circuit 102 communicates with the control 84 in the key fob housing 42 and the wireless signal transmitted to the control unit 16 on the vehicle 12 indicates that the key fob assembly 14 is in the operator mode. With the key fob assembly 14 in the operator mode, the operator of the vehicle is allowed access to these secured areas on the vehicle 12 via the security systems. The mode signal can be transmitted to the control unit 16 on the vehicle 12 in response to each interrogation signal received by the key fob assembly 14 from the control unit 16.

The key fob assembly 14 is manufactured in such a manner that defeating the built-in security, which could allow the key fob assembly to communicate with the control unit 16 even when the mechanical key 40 is removed from the key fob 42, is very difficult. For example, if only one Hall effect switch were found in the key fob housing 42, a common refrigerator magnet might be able to be used to defeat the security of the system. The common refrigerator magnet could be positioned against the key head facing surface 78 to place the single Hall effect switch into the appropriate operating state so that signals transferred from the key fob assembly 14 to the control unit 16 could indicate that the mechanical key 40 is properly attached with the key fob housing 42. The subject key fob assembly 14, however, includes at least two Hall effect sensors (three Hall effect sensors are shown) so that a single refrigerator magnet appropriately placed against the housing 42 would not defeat the security of the passive entry system 10 and allow a parking valet complete access to secured areas on the vehicle. In addition, increasing the number of Hall effect switches in the key fob assembly 14 and increasing the number of magnets associated with the mechanical key 40 further increases the number of possible combinations required to place the key fob assembly 14 in the appropriate mode to allow for complete access to all secured areas of the vehicle 12.

As an additional security measure, in the depicted embodiment, the Hall effect switches 100a, 100b, 100c are disposed adjacent the key head facing surface 78 and the key head facing surface has a smaller surface area as compared to the upper surface 70 and the lower surface (not visible) of the key fob housing 42. Such a small surface area further complicates attempts to defeat the security of the key fob assembly because very small magnets need to be aligned with the Hall effect switches with the appropriate polarity for each magnet to place the key fob assembly in the operator mode. In addition, as mentioned above, the Hall effect switches 100a, 100b, 100c are each selectively configurable to selectively configure the respective magnetic field that is detected which results in the change in the respective operating state of each of the Hall effect switches. As such, customizing the combination necessary to provide an appropriate output signal from the integrated circuit 102 to the control 84 of the key fob assembly 14 can be selectively configured. This can further complicate defeating the security of the passive entry system 10 in that the Hall effect switches 100a, 100b, 100c can be selectively configured to each detect a different polarity. By providing selectively configurable Hall effect switches, different keys for the same model vehicle may not work with different key fob assemblies. This provides further security to the passive entry system 10.

A passive entry system for a vehicle, a key fob assembly for the passive entry system, a key fob for the passive entry system, and a mechanical key have been described with particularity above. Modifications and alterations will occur to those upon reading and understanding the preceding detailed description. The invention, however, is not limited to only the embodiment described above. Instead, the invention is broadly defined by the appended claims and the equivalents thereof.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A key fob cooperating with an associated mechanical key, the key fob comprising:
a key fob housing including a slot for receiving the associated mechanical key;
a control in the housing for transmitting wireless signals to a vehicle to actuate components on the vehicle; and
a plurality of Hall effect switches in the housing, each Hall effect switch being in electrical communication with the control, wherein at least one of the Hall effect switches is configured to change a respective operating state based upon detecting a positive magnetic field and at least one other Hall effect switch is configured to change an operating state based upon detecting a negative magnetic field, wherein each Hall effect switch is associated with an integrated circuit and the integrated circuit is software configurable to output an output signal to the control and a respective magnetic field to selectively configure a respective magnetic field that is detected, which results in the change in the respective operating state of each Hall effect switch,
wherein the slot is elongated in a first direction and is configured to receive a blade of a mechanical key, and
wherein the housing includes an upper surface, a lower surface and a key head facing surface spanning between the upper surface and the lower surface, wherein the slot extends into the housing from the key head facing surface, wherein the plurality of Hall effect switches are disposed adjacent the key head facing surface and the key head facing surface has a smaller surface area as compared to the upper surface and the lower surface.

2. The key fob of claim 1, wherein the control is configured to transmit a valet mode signal to the vehicle upon detecting a predetermined operating state for each of the Hall effect switches.

3. The key fob of claim 1, wherein the plurality of Hall effect switches includes a further Hall effect switch configured to change a respective operating state based upon detecting one of a positive or a negative magnetic field.

4. The key fob of claim 3, wherein each Hall effect switch is laterally spaced from the slot along a second direction and each Hall effect switch is disposed adjacent one another and on a same side of the slot.

5. The key fob of claim 4, wherein at least one of the Hall effect switches is configured to change the respective operating state upon detecting a different magnetic field as compared to another Hall effect switch immediately adjacent the at least one Hall effect switch.

6. A key fob assembly comprising:
a mechanical key configured to cooperate with a mechanical lock, the mechanical key including a head including a key fob facing surface a blade connected with and extending from the head in a first direction, which is orthogonal to a plane defining the key fob facing surface, and a plurality of magnets in the head adjacent the key fob facing surface, each of the magnets disposed on a same side of the blade;
a key fob configured to selectively connect with the mechanical key, the key fob including a key fob housing having a slot for receiving the blade of the mechanical key and a key head facing surface, wherein the slot extends into the housing from the key head facing surface, wherein key fob facing surface has a complementary shape to the key head facing surface;
a control in the key fob for transmitting wireless signals to a vehicle to actuate components on the vehicle;
a plurality of Hall effect switches in the key fob adjacent the key head facing surface, each Hall effect switch disposed adjacent one another and on a same side of the slot, each Hall effect switch being in electrical communication with the control and including software that selectively configures a respective magnetic field that is detected by each Hall effect switch, wherein at least one of the Hall effect switches changes an operating state based on detecting a positive magnetic field and at least one other Hall effect switch changes an operating state based on detecting a negative magnetic field; and
respective poles of the magnets being disposed adjacent to the key fob facing surface such that insertion of the blade of the mechanical key into the slot in the key fob housing in a storage position aligns the poles of the magnets with respective Hall effect switches for changing the operating state of the respective Hall effect switches.

7. The key fob assembly of claim 6, wherein the plurality of magnets includes at least three magnets each having a respective key fob facing pole that faces the key fob when the mechanical key is connected with the key fob and in the storage position, wherein at least one of the key fob facing poles is different in polarity than at least two other key fob facing poles.

8. A passive entry system comprising:
the key fob assembly of claim 6,
a vehicle;
a receiver on the vehicle for receiving the wireless signals from the key fob assembly;
a transmitter on the vehicle for transmitting vehicle originating wireless signals to the key fob assembly; and
a control unit in communication with the receiver, the transmitter, and security systems on the vehicle, wherein the control unit is configured to lock secured areas on the vehicle via at least one of the security systems in response to receiving a valet mode signal from the key fob assembly indicating that the mechanical key has been disconnected from the key fob.

9. The passive entry system of claim 8, wherein the secured areas include a trunk and a glove box of the vehicle.

10. The passive entry system of claim 8, wherein the control unit limits operation of an engine of the vehicle in response to receiving the valet mode signal.

* * * * *